(12) United States Patent
Cusin et al.

(10) Patent No.: US 8,623,228 B2
(45) Date of Patent: Jan. 7, 2014

(54) FREELY MOUNTED WHEEL SET MADE OF MICRO-MACHINABLE MATERIAL AND METHOD OF FABRICATING THE SAME

(75) Inventors: Pierre Cusin, Villars-Burquin (CH); Jean-Philippe Thiebaud, Cudrefin (CH)

(73) Assignee: Nivarox-FAR S.A., Le Locle (CH)

(*) Notice: Subject to any disclaimer, the term of this patent is extended or adjusted under 35 U.S.C. 154(b) by 617 days.

(21) Appl. No.: 12/899,124

(22) Filed: Oct. 6, 2010

(65) Prior Publication Data
US 2011/0079100 A1 Apr. 7, 2011

(30) Foreign Application Priority Data
Oct. 7, 2009 (EP) .................... 09172455

(51) Int. Cl.
- B23P 15/00 (2006.01)
- C03C 25/00 (2006.01)
- C23F 1/00 (2006.01)
- C25D 1/00 (2006.01)

(52) U.S. Cl.
USPC ............................. 216/39; 205/67

(58) Field of Classification Search
USPC ........................................... 216/79
See application file for complete search history.

(56) References Cited

U.S. PATENT DOCUMENTS 6,307,815 B1* 10/2001 Polosky et al. ............ 368/220
7,887,995 B2* 2/2011 Niwa et al. ................ 430/312

FOREIGN PATENT DOCUMENTS

| EP | 0 579 093 A1 | 1/1994 |
| EP | 2 060 534 A1 | 5/2009 |
| FR | 1 557 064 A | 2/1969 |
| FR | 2 064 009 A1 | 7/1971 |
| WO | 2008/135817 A2 | 11/2008 |

OTHER PUBLICATIONS

European Search Report issued in corresponding application No. EP09 17 2455, completed Apr. 8, 2010.

* cited by examiner

*Primary Examiner* — Binh X Tran
*Assistant Examiner* — Thomas Pham
(74) *Attorney, Agent, or Firm* — Griffin & Szipl, P.C.

(57) ABSTRACT

The invention relates to a gear train (51, 51') including an arbour (53, 53') a first end of which is fitted with an integral collar (52, 52'), a first wheel set (55, 55') made of micro-machinable material being fitted onto the second end of the arbour (53, 53'). According to the invention, the gear train (51, 51') includes a second wheel set (57, 57') made of micro-machinable material, which is independent of the movements of said first wheel set and which includes an aperture (58, 58') whose wall is mounted opposite said arbour so that the second wheel set (57, 57') is freely mounted on said first end of the arbour (53, 53').

10 Claims, 4 Drawing Sheets

FREELY MOUNTED WHEEL SET MADE OF MICRO-MACHINABLE MATERIAL AND METHOD OF FABRICATING THE SAME

This application claims priority from European Patent Application No. 09172455.9 filed Oct. 7, 2009, the entire disclosure of which is incorporated herein by reference.

FIELD OF THE INVENTION

The invention relates to a wheel set made of micro-machinable material freely mounted on a single-piece arbour and a method of fabricating the same. More specifically, the invention relates to a gear train that includes a wheel set of this type.

BACKGROUND OF THE INVENTION

It is known to make silicon wheels for a timepiece. However, such wheels are not easy to handle and it is not currently possible to fabricate a freely mounted wheel set for a timepiece without risking damaging or even breaking it.

SUMMARY OF THE INVENTION

It is an object of the present invention to overcome all or part of the aforementioned drawbacks by proposing a gear train wherein at least one of the wheel sets, made of micro-machinable material, is freely mounted and a method of manufacturing the same.

The invention therefore relates to a gear train comprising an arbour, one end of which is fitted with an integral collar, a first wheel set made of micro-machinable material being fitted onto the second end of the arbour, characterized in that the gear train includes a second wheel set, made of micro-machinable material, which is independent of the movements of said first wheel set and which has an aperture whose wall is mounted opposite said arbour, so that the second wheel set is freely mounted on said first end of the arbour.

According to the invention, it is clear that it is possible to fabricate a gear train wherein one wheel, for example a crystalline silicon wheel, is freely mounted on a single-piece metal arbour.

According to other advantageous features of the invention:
said second end is fitted with a second collar integral with the arbour, which partially covers said wheel set;
said second collar is toothed so as to form a second level of said first wheel set;
the first wheel set has, at least partially, an external coating;
said arbour is made of low friction material;
the micro-machinable materials are silicon-based.

Moreover, the invention relates to a timepiece, characterized in that it includes at least one gear train conforming to one of the preceding variants.

Finally, the invention relates to a method of fabricating a gear train that includes the following steps:
a) taking a substrate that includes a top layer and a bottom layer made of micro-machinable material, secured to each other by an intermediate layer;
b) etching at least one pattern in the top layer and the intermediate layer until the bottom layer is exposed, so as to form at least a first cavity belonging to a first wheel set;
c) coating at least the bottom of said at least one first cavity with an electrically conductive coating;
d) electroforming a material, at least in the bottom of said at least one first cavity;
e) etching a second pattern in the bottom layer as far as the coating of said electrically conductive material, so as to form at least one second cavity belonging to a second wheel set;
f) structuring a photosensitive resin on the bottom of the bottom layer, forming a sheathing on the walls of said at least one second cavity and at least one recess that flares out coaxially from said at least one second cavity;
g) continuing the electroforming started in step d), so as to fill said at least one first cavity, and starting to electroform a material in said at least one second cavity and said at least one recess so as to form an arbour fitted with a collar;
h) removing the photosensitive resin;
i) removing the intermediate layer so as to separate the first and second wheel sets; and
j) releasing the fabricated wheel set from the substrate.

According to the invention, it is clear that it is possible to fabricate the gear train explained above very precisely from a single substrate in accordance with combined LIGA and DRIE processes.

According to other advantageous features of the invention:
step f) also includes phase k): coating at least the bottom of said at least one recess with a second electrically conductive coating, so as to improve the forming of said collar;
prior to step d), the method includes step l): mounting a part on the top of the substrate so as to form at least one other recess that flares out coaxially from said at least one first cavity, so as to provide a level of electroformed material above the top layer;
step c) also allows at least the bottom of said at least one other recess to be coated with said electrically conductive coating;
after step c), the method includes step m): mounting a pin in said at least one first cavity so as to form a hole in the future gear train;
prior to step g), the method includes step n): mounting a pin in said at least one second cavity so as to form a hole in the future gear train;
steps b) and e) include the phases of structuring at least one protective mask on the layer to be etched, performing an anisotropic etch of said layer over the parts that are not covered by said at least one protective mask, and removing the protective mask;
several gear trains are fabricated on the same substrate;
each coating includes at least one gold layer;
the micro-machinable materials are silicon-based.

BRIEF DESCRIPTION OF THE DRAWINGS

Other features and advantages will appear clearly from the following description, given by way of non-limiting illustration, with reference to the annexed drawings, in which.

DETAILED DESCRIPTION OF THE PREFERRED EMBODIMENTS

Figure 15:
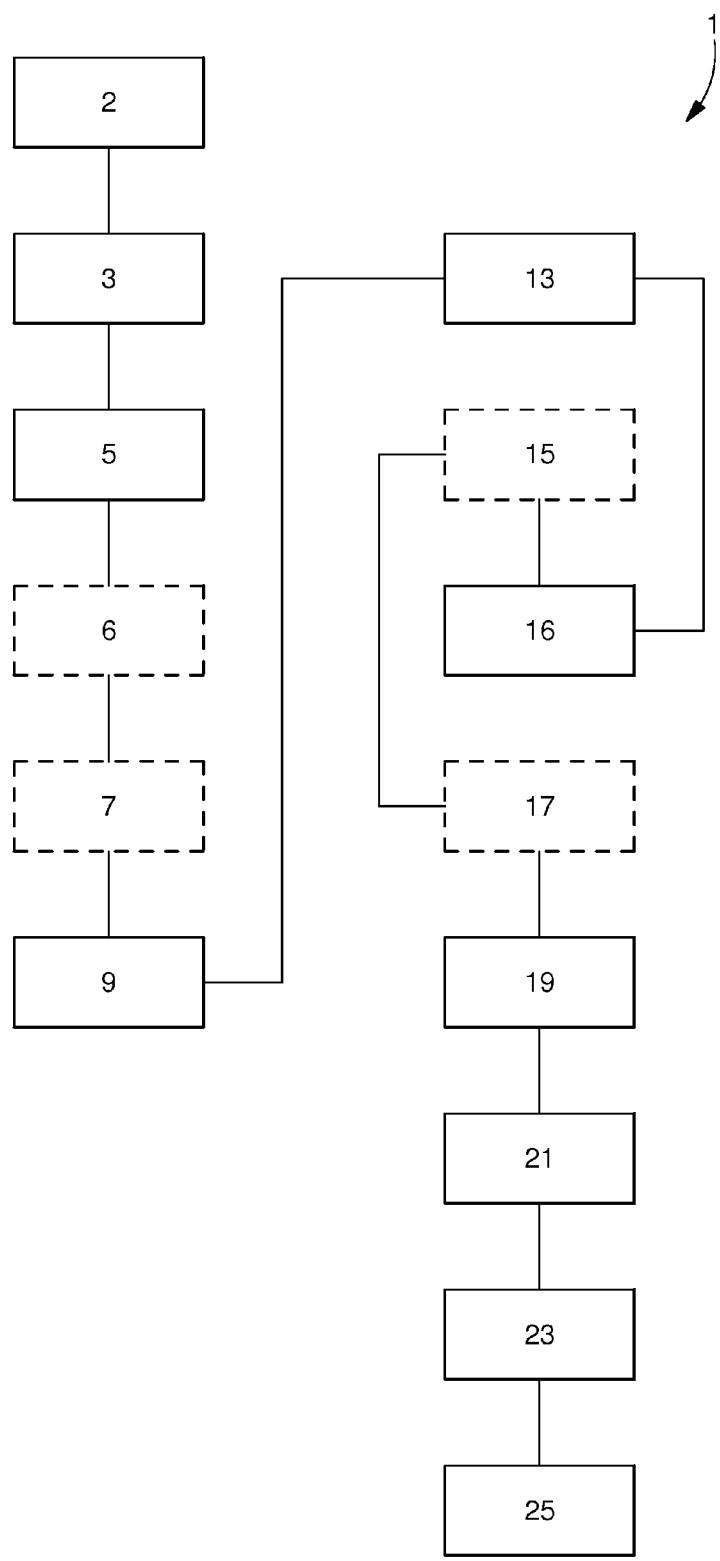
FIG. 15 is a flow diagram of a method of fabricating a gear train according to the invention.

As can be seen in FIG. 15, the invention relates to a method 1 of fabricating a gear train 51, 51' for example for a timepiece. Fabricating method 1 includes successive steps for preparing a substrate 29 made of micro-machinable materials, such as, preferably, silicon-based materials. In the illustration below, the respective sizes are not to the same scale. Some thicknesses, such as those of coatings 37 and 47, are been increased so as to make said illustration easier to comprehend.

Figure 1:
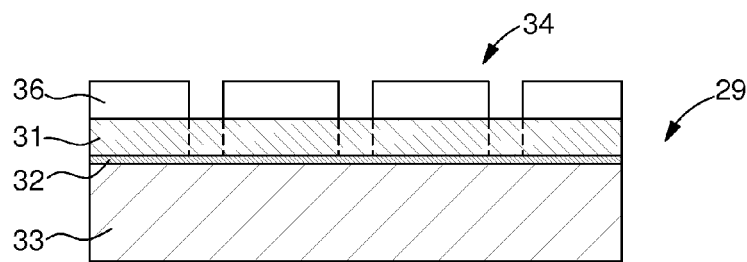
FIGS. 1 to 11 are diagrams of successive steps of a method of fabricating a gear train in accordance with one embodiment of the invention.

A first step 2 of method 1 consists in taking a substrate 9 that includes a top layer 31 and a bottom layer 33, made of micro-machinable material, and secured to each other by an intermediate layer 32, as illustrated in FIG. 1.

Preferably, substrate 29 is a silicon-on-insulator (S.O.I.). Thus intermediate layer 32 is preferably made of silicon dioxide. Further, top and bottom layers 31 and 33 are crystalline silicon.

According to the invention, method 1 includes a second step 3, for etching at least one pattern 34 in top layer 31 and intermediate layer 32 until the top of bottom layer 33 is partially exposed.

The second step 3 consists, firstly, in structuring at least one protective mask 36 on top layer 31, as illustrated in FIG. 1. As FIG. 1 also shows, mask 36 includes at least one pattern 34, which does not cover top layer 31. This mask 36 may, for example, be obtained by photolithography using a positive or negative photosensitive resin.

Figure 2:
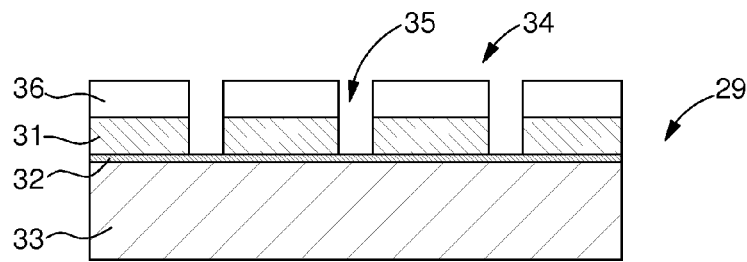

Secondly, top layer 31 is etched until intermediate layer 32 is exposed, as illustrated in FIG. 2. According to the invention, the etching preferably includes a dry anisotropic DRIE etch. The anisotropic etch is performed on top layer 31 over pattern 34 of mask 36.

Thirdly, pattern 34 is extended into intermediate layer 32 by etching until the top of bottom layer 33 is partially exposed. According to the invention, the etching may include a chemical or directional etch of the exposed parts of layer 32.

Fourthly, mask 36 is removed. Of course, depending upon the resistance of mask 36 to the mode of etching intermediate layer 32, mask 36 can be removed prior to or after this etch.

Figure 3:
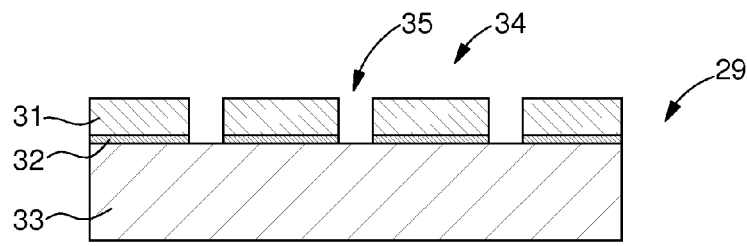

Thus, as FIG. 3 shows, at the end of second step 3, the entire thickness of top and intermediate layers 31 and 32 are etched with at least one cavity 35, for forming a first wheel set 55, 55' of the future gear train 51, 51'.

Figure 4:
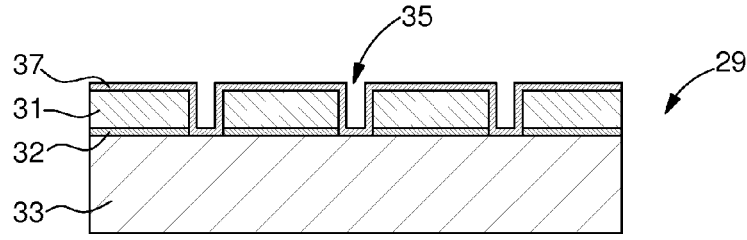

In a third step 5, an electrically conductive coating 37 is deposited by coating at least the bottom of each of said at least one cavity 35. In the example illustrated in FIG. 4, it can be seen that it is the whole top of substrate 29 that is coated. As will be explained below, the walls of said at least one cavity 35 do not need to be coated, although the coating may be required to be present on the top of top layer 31 for the alternative embodiment of gear train 51' below.

Preferably, coating 37 is obtained by vapour phase deposition. However, other types of deposition can be envisaged, such as chemical deposition. Coating 37 preferably includes at least one gold layer, which may be deposited on a chromium primer layer.

Preferably, in order to limit the areas of the future electroforming, method 1 can include a step 6 consisting in mounting a part 38 on the top of substrate 29. This step 6 may consist, for example, in structuring a positive or negative photosensitive resin by photolithography.

Figure 5:
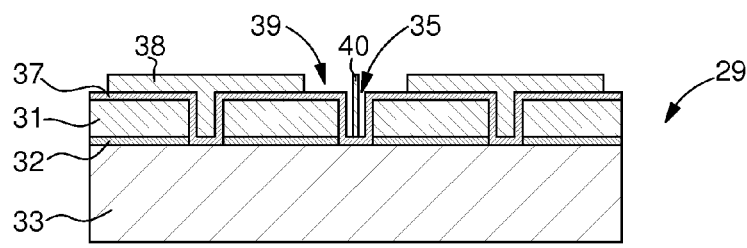

Advantageously, this step 6 can also allow the formation of at least one recess 39, flaring out coaxially from said at least one cavity 35, to make said variant of gear train 51', as illustrated in FIG. 5.

Preferably, method 1 can include at the same time, prior to or after step 6, a step 7, which consists in mounting a pin 40, as illustrated in FIG. 5, from the bottom of said at least one cavity 35 to form an arbour hole 54, 54' for gear train 51, 51' immediately during the future electroforming. This has the advantage not only of avoiding the need to machine gear train 51, 51' once the electroforming has finished, but also of making it possible to make an inner section of any shape, whether uniform or not, over the entire top of the future hole 54, 54'. This step 7 may also consist, for example, in structuring a positive or negative photosensitive resin by photolithography.

Figure 6:
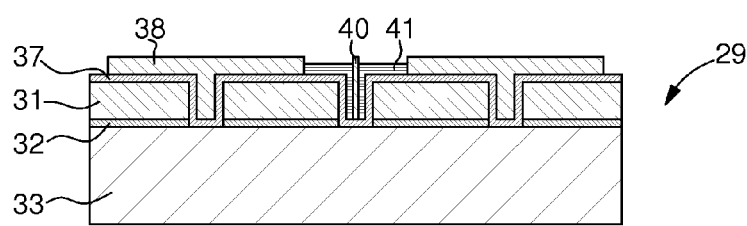

Method 1 then continues with electroforming step 9 for growing an electrolytic deposition 41 at least in the bottom of said at least one cavity 35. In the example illustrated in FIG. 6, showing gear train variant 51', it can be seen that deposition 41 grows both in said at least one cavity 35 and in said at least one recess 39 around pin 40.

Preferably, step 9 is stopped before the deposition exceeds the top of substrate 29. In the case of the first gear train variant 51, the top of substrate 29 is the top of said at least one cavity 35. In the case of the second gear train variant 51', the top of substrate 29 is the top of said at least one recess 39 as illustrated in FIG. 6. It is clear why, in this second variant, it may be necessary for the top of top layer 31, i.e. the bottom of said at least one recess 39, to also include coating 37 formed in step 5.

According to the invention, method 1 continues with step 13 for etching at least one pattern 44 in bottom layer 33 until coating 37 is exposed, and possibly deposition 41.

Figure 7:
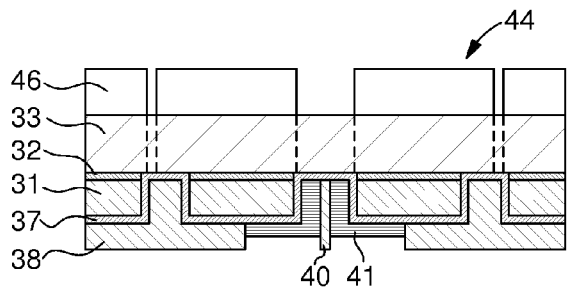

Step 13 consists, firstly, in structuring at least one protective mask 46 on bottom layer 33, as illustrated in FIG. 7. As FIG. 7 also shows, mask 46 includes at least one pattern 44, which does not cover bottom layer 33. This mask 46 may, for example, be obtained by photolithography using a positive or negative photosensitive resin.

Secondly, bottom layer 33 is etched until coating 37 is exposed and, possibly, deposition 41. According to the invention, the etching preferably includes a dry anisotropic DRIE etch. The anisotropic etch is performed in bottom layer 33 according to pattern 44 of mask 46.

Thirdly, mask 46 is removed. Thus, at the end of step 13, the entire thickness of bottom layer 33 is etched with at least one second cavity 45, allowing a second wheel set 57, 57' of the future gear train 51, 51' to be formed.

Method 1 then includes a step 16 consisting in structuring a photosensitive resin 43 over the bottom of bottom layer 33, forming a sheathing 51 on the walls of said at least one second cavity 45.

Preferably, in a next step 15, an electrically conductive coating 47 is deposited, covering the top of structured resin 43. By analogy with the walls of said at least one cavity 35, sheathing 51 of said at least one second cavity 45 no longer needs to be coated.

Preferably, coating 47 is obtained by a vapour phase deposition. However, other types of deposition can be envisaged, such as a chemical deposition. Preferably, coating 47 includes at least one gold layer, possibly deposited on a chromium primer layer.

Preferably, in order to form at least one second recess 49 that flares out coaxially from said at least one second cavity 45, method 1 includes a step 17 consisting in mounting a part 48 on the bottom of substrate 29. This step 17 may consist, for example, in structuring a positive or negative photosensitive resin by photolithography.

Figure 8:
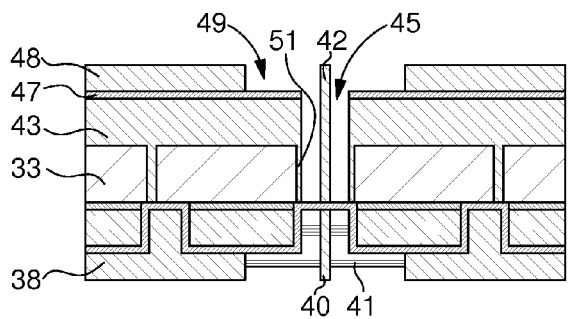

Preferably, step 17 of the method 1 can also consist in mounting a pin 42, as illustrated in FIG. 8, from the bottom of said at least one second cavity 45, so as to form an arbour hole 54, 54' for gear train 51, 51' immediately during the future electroforming with the same advantages as explained with reference to pin 40. Preferably, if pins 40 and 42 are respectively formed in cavities 35 and 45, they are aligned.

Method 1 continues then with a new electroforming step 19 for continuing the deposition started in step 9, so as to fill said at least one cavity 35 (and possibly said at least one recess 39) and for starting to electroform a material in said at least one second cavity 45 and said at least one second recess 49 to form an arbour 53, 53' fitted with a collar 52, 52' and, possibly, a second collar 54'.

Figure 9:
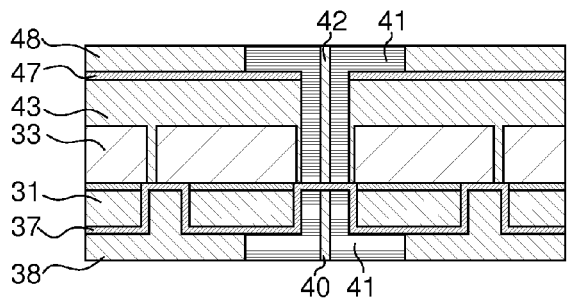

Preferably, at the end of step 19, electrolytic deposition 41 exceeds the top and bottom of substrate 29. Lapping is then performed to make deposition 41 level with substrate 29 as illustrated in FIG. 9.

Figure 10:
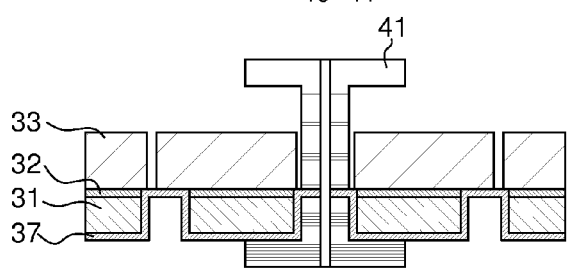

Method 1 continues with step 21 of removing resin 43 from part 48 and, possibly, from part 38 as illustrated in FIG. 10. The next step 23 consists in removing intermediate layer 32 so as to detach the first 55, 55' and second 57, 57' wheel sets formed in top layer 31 and bottom layer 33 respectively. According to the invention, removal is performed by etching which may consist, for example, of a chemical etch. Finally, in the final step 25, the gear train 51, 51' thereby formed is released from substrate 29.

Figure 13:
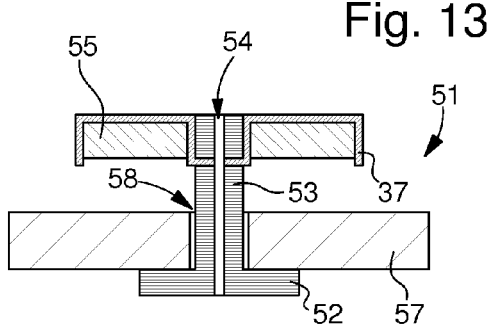
FIG. 13 is a diagram of the last step of a method of fabricating a gear train according to a variant of the invention.
Figure 14:
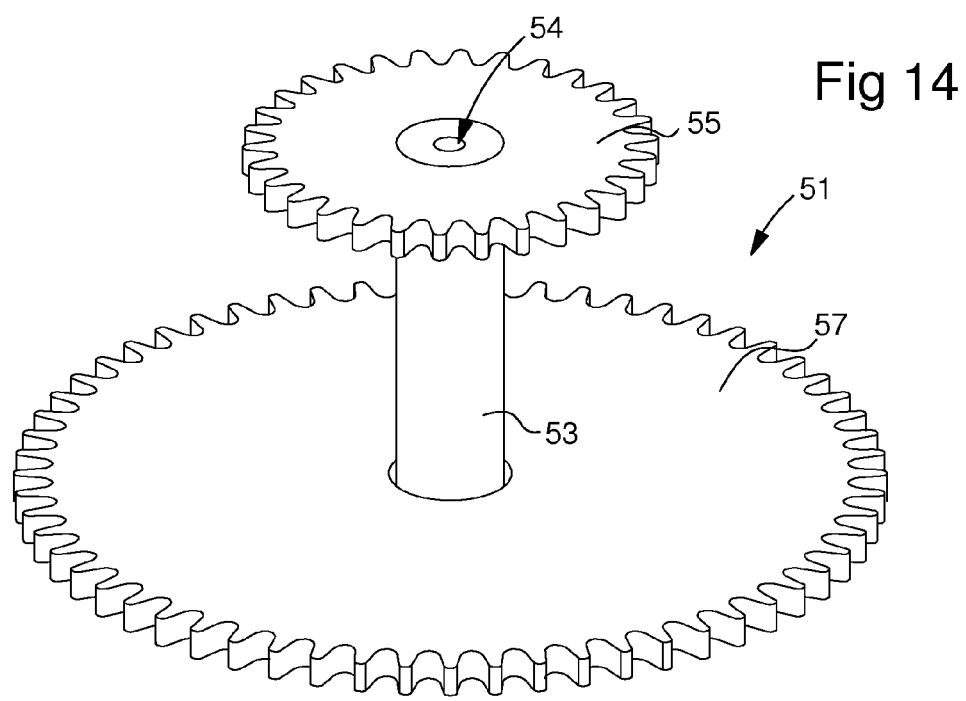
FIG. 14 is a perspective diagram of a gear train according to a variant of the invention.

Thus, according to the first variant of method 1 illustrated in FIGS. 13 and 14, the invention allows a composite gear train 51 to be made, comprising an arbour 53, a first end of which is fitted with an integral collar 52, a first wheel set 55 made of micro-machinable material being fitted onto the second end of arbour 53 and a second wheel set 57 made of micro-machinable material, which is independent of the movements of said first wheel set and which includes an aperture 58 whose wall is mounted opposite arbour 53 so that the second wheel set 57 is freely mounted on said first end of arbour 53. As illustrated in FIGS. 13 and 14, it can be seen that arbour 53 includes a hole 54 allowing gear train 51 to be driven against an arbour or pivot.

Figure 11:
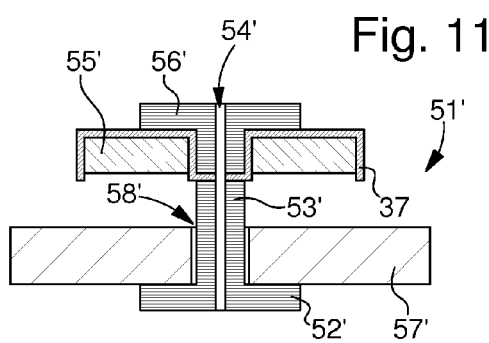
Figure 12:
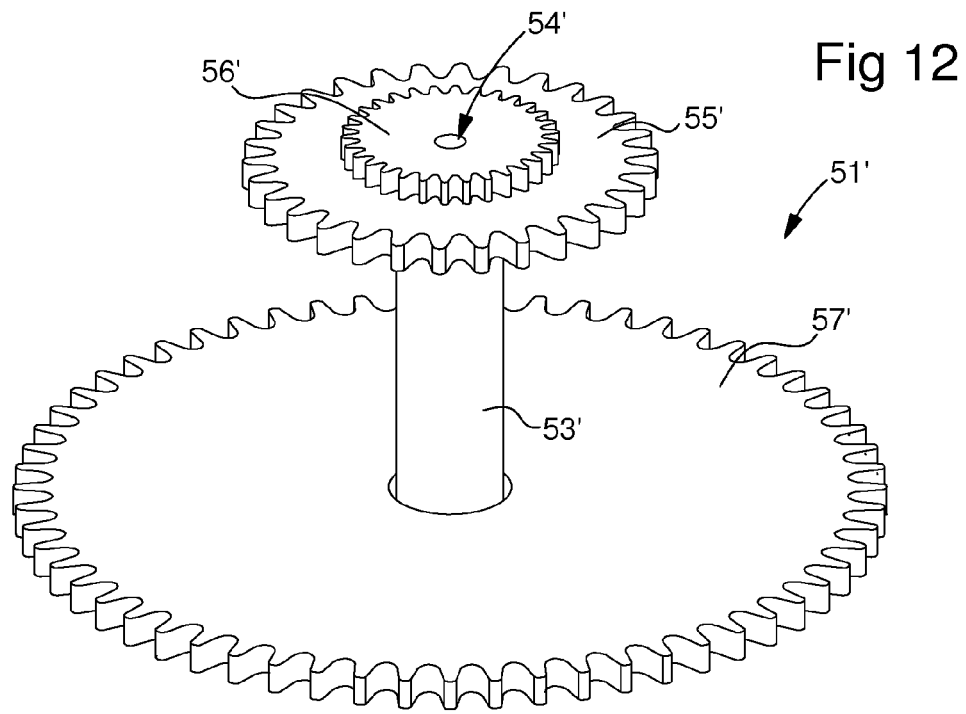
FIG. 12 is a perspective diagram of a gear train according to one embodiment of the invention.

According to the second variant of method 1 illustrated in FIGS. 11 and 12, the invention allows a composite gear train 51' to be made comprising an arbour 53', whose first and second ends are fitted with an integral collar 52', 56'. Moreover, gear train 51' includes a first wheel set, wherein a first wheel 55', made of micro-machinable material, is fitted onto the second end of arbour 53', secured to and partially covering the second collar, forming a second wheel 56' of electroformed material. A second wheel set 57' in micro-machinable material, which is independent of the movements of said first wheel set and which includes an aperture 58', whose wall is mounted opposite said arbour, so that the second wheel set 57' is freely mounted on said first end of arbour 53'. As illustrated in FIGS. 11 and 12, it can be seen that arbour 53' includes a hole 54' allowing gear train 51' to be driven against an arbour or pivot.

As FIGS. 11 and 13 show, the first wheel set 55, 55' can include, at least partially, an external coating that corresponds to fine coating layer 37 to improve the tribology of said first wheel set 55, 55'. Moreover, preferably, the electroformed arbour 53, 53' is made of a low friction material.

Of course, the present invention is not limited to the illustrated example but is capable of various variants and alterations which will appear to those skilled in the art. Thus, several gear trains 51, 51' can be fabricated on the same substrate 29 to allow mass production of gear trains 51, 51', which are not necessarily identical to each other. Likewise, one could also envisage changing the silicon-based materials for crystallised alumina or crystallised silica or silicon carbide.

One could also envisage coatings 37 and/or 47 being different in nature and/or each deposited in accordance with different methods from those explained above. One could also envisage coatings 37 and/or 47 being redundant if an electrically conductive micro-machinable material, such as doped silicon, is used and/or if resin 43 is electrically conductive.

Finally, collar 52, 52', like collar 54, 54' can also include a toothing. Moreover, the application of gear train 51, 51' is not limited to a timepiece.

What is claimed is:

1. A method of fabricating a gear train, the method comprising the following steps:
   a) providing a substrate that includes a top layer and a bottom layer made of micro-machinable material, wherein the top layer and the bottom layer are secured to each other by an intermediate layer;
   b) etching at least one pattern in the top layer and the intermediate layer until the bottom layer is exposed, wherein etching the at least one pattern forms at least one first cavity belonging to a first wheel set;
   c) coating at least the bottom of the at least one first cavity with an electrically conductive coating;
   d) electroforming a material, at least in the bottom of the at least one first cavity;
   e) etching a second pattern in the bottom layer as far as the coating of the electrically conductive material, wherein etching the second pattern forms at least one second cavity belonging to a second wheel set;
   f) structuring a photosensitive resin on the bottom of the bottom layer, wherein the photosensitive resin forms a sheathing on the walls of the at least one second cavity and at least one recess, wherein the photosensitive resin that flares out coaxially from the at least second cavity;
   g) continuing the electroforming started in step d) to fill the at least one first cavity and starting to electroform a material in the at least one second cavity and the at least one recess, wherein the electroforming forms an arbour fitted with a collar;
   h) removing the photosensitive resin;
   i) removing the intermediate layer, wherein removing the intermediate layer separates the first and second wheel sets; and
   j) releasing the fabricated wheel set from the substrate.

2. The method according to claim 1, wherein step f) also includes the following phase:
   k) coating at least the bottom of the at least one recess with a second electrically conductive coating to improve the forming of the collar.

3. The method according to claim 1, wherein prior to step d), the method includes the following step:
   l) mounting a part on the top of the substrate, wherein mounting the part forms at least one other recess that flares out coaxially from the at least one first cavity, wherein mounting the part provides a level of electroformed material above the top layer.

4. The method according claim 3, wherein step c) also allows at least the bottom of the at least one other recess to be coated with the electrically conductive coating.

5. The method according to claim 1, wherein, after step c), the method includes the following step:

m) mounting a pin in the at least one first cavity, wherein mounting the pin forms a hole in the future gear train.

6. The method according to claim 1, wherein, prior to step g), the method includes the following step:

n) mounting a pin in the at least one second cavity, wherein mounting the pin forms a hole in the future gear train.

7. The method according to claim 1, wherein steps b) and e) include the following phases:

structuring at least one protective mask on the layer to be etched;

performing an anisotropic etch of the layer over the parts that are not covered by the at least one protective mask;

removing the mask.

8. The method according to claim 1, wherein several gear trains are fabricated on the same substrate.

9. The method according to claim 1, wherein each coating includes at least one gold layer.

10. The method according to claim 1, wherein the micromachinable materials are silicon-based.

\* \* \* \* \*